March 26, 1968 — C. H. GEARY — 3,374,680
SHAFT SPEED LIMITING DEVICE
Filed Sept. 13, 1965

*INVENTOR.*
CARL H. GEARY.
BY
ATTORNEY.

3,374,680
SHAFT SPEED LIMITING DEVICE
Carl H. Geary, Irwin, Pa., assignor to Carrier Corporation, Syracuse, N.Y., a corporation of Delaware
Filed Sept. 13, 1965, Ser. No. 486,816
2 Claims. (Cl. 73—538)

This invention relates to apparatus for automatically limiting the maximum speed of a rotating shaft. More particularly, this invention relates to a device for limiting the maximum speed of an extremely high speed shaft. Still more particularly, this invention relates to a Belleville spring, trip device for limiting shaft speed.

At extremely high shaft speeds, ordinary speed limiting devices are subject to excessive friction and are therefore quite inaccurate. To alleviate this problem, a Belleville spring, shaft speed limiting system has been employed. This system includes a Belleville spring trip mechanism relying on the snap-over effect of the Belleville spring to actuate an overspeed trip switch. However, due to the inherent hysteresis in a Belleville spring, the rotating machinery employing a Belleville spring actuated trip switch is required to slow down to a very low speed before the spring will snap back to its nontrip position and allow the trip switch to be reset.

It is therefore an object of this invention to provide means for overcoming the inherent hysteresis of the Belleville spring to force the spring to snap back to a nontrip position as soon as the overspeeding shaft slows to normal operating speed.

This invention relates to a Belleville spring, shaft speed limiting trip device having a first Belleville spring mounted on a rotary shaft. This first Belleville spring has weights mounted thereon so that centrifugal force will cause the weighted spring to snap over when a predetermined maximum speed is reached. A second Belleville spring is mounted on the shaft in such a position that when the first spring snaps over, it will come in contact with the second spring, stressing the second spring short of its snap-over position so that it will exert a return force on the first spring.

The attached drawings illustrate a preferred embodiment of my invention in which.

Figure 1:
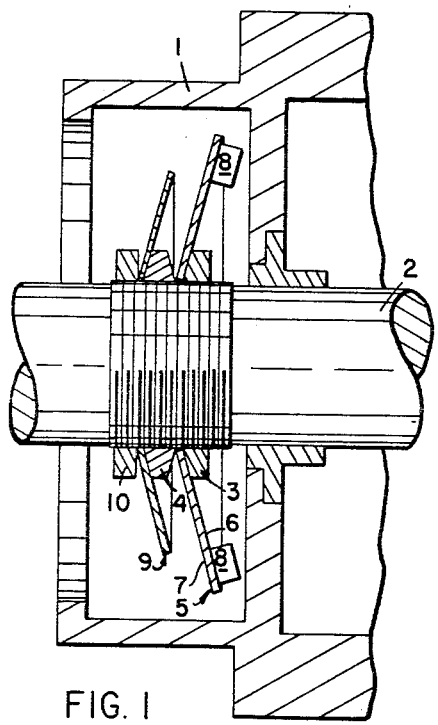
FIGURE 1 is a vertical section through part of a rotary machine showing the trip device forming the subject of this invention as it is applied to a shaft of a rotary machine.
Figures 2, 3:
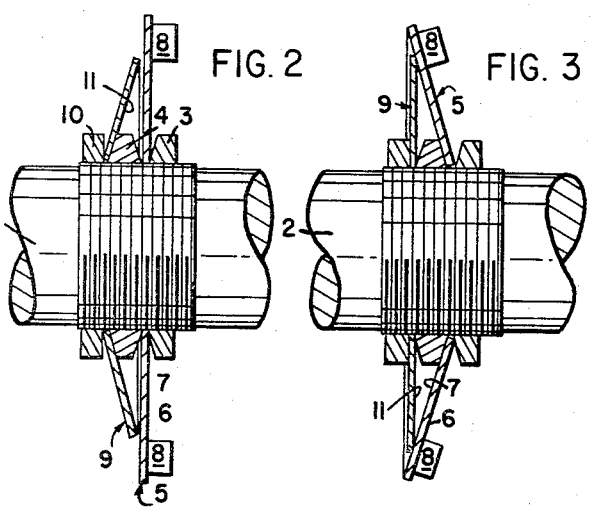
FIGURE 2 is a vertical sectional view through the speed limiting device of this invention showing the displacement of the Belleville springs just before snap over.
FIGURE 3 is a vertical sectional view through the speed limiting device of this invention showing the displacement of the Belleville springs after snap over.

Referring to the attached drawings, there is shown a small part of a rotary machine 1 such as a gas compressor, a steam or gas driven turbine or any similar machine having a power shaft 2 mounted thereon. A Belleville control spring 5 having sides 6 and 7 is mounted on shaft 2 between collars 3 and 4. When the spring 5 is in its unstressed position, side 6 is concave and side 7 is convex. The spring 5 has weights 8 attached thereto on side 6. This construction, as illustrated in United States Patent 2,973,771 operates an overspeed trip switch as disclosed in the patent for terminating the supply of energy to the prime mover driving the rotary machine shaft 2 when the spring is subjected to centrifugal forces generated by shaft 2, of a magnitude sufficient to cause the spring 5 to deflect beyond its snap-over stress point. This invention is an improvement over the previous Belleville spring overspeed trip mechanism in that it incorporates a second Belleville spring 9 to return the spring 5 to its nontrip position as soon as the shaft 2 slows to normal operating speed. The Belleville spring 9 is held in position on shaft 2, by collars 4 and 10, with its concave side 11 facing the first spring 5.

Considering the operation of this invention, it will be appreciated that the rotary machine will have an operating speed range predetermined by the machine design. When the machine speed exceeds this range, centrifugal force acting on the spring 5 and weights 8 will cause spring 5 to snap over and contact a trip switch, not shown, to cut off power to the prime mover driving the rotary machine. This will allow the machine to coast down to a low speed at which time the Belleville spring 5 will snap over to a nontrip position to enable the machine operator to reset the trip switch and reactivate the machine. In the present invention, when Belleville spring 5 snaps over to trip position, it will contact spring 9, stressing spring 9 short of its snap-over position. Spring 9 will therefore exert a return force on spring 5, causing spring 5 to be returned to a nontrip position while the machine is still coasting within its operating speed range so that the operator can reset the switch and reactivate the machine before its speed drops below the operating speed range.

Figure 4:
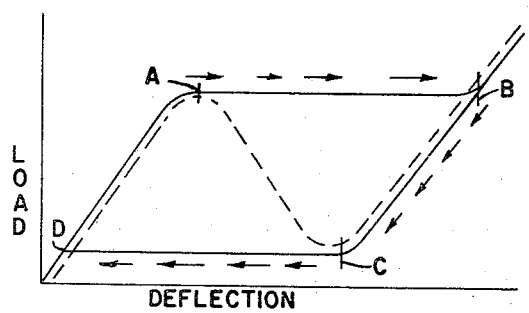
FIGURE 4 is a diagram illustrating how the first Belleville control spring deflects under load in the absence of a second Belleville spring.
Figure 5:
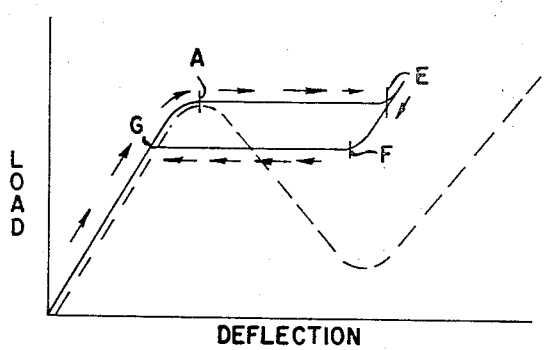
FIGURE 5 is a diagram illustrating the deflection of the first Belleville spring under the influence of a second Belleville spring arranged as disclosed in this specification.

A primary advantage of the construction here proposed is graphically represented in FIGURES 4 and 5. As pointed out above, FIGURE 4 shows the relationship between spring deflection and load (proportional to shaft speed) of a Belleville control spring. The dotted line shows the theoretical characteristics of the Belleville spring used in the construction of this invention. The solid line shows the actual load-deflection curve of the Belleville control spring employed in the present invention. When the control spring becomes loaded to the extent shown at point A, it will snap over to a deflection represented by point B. If the load is decreased, the deflection will decrease to point C, at which load, the spring will snap back to a deflection represented by point D.

FIGURE 5 illustrates the relationship between spring deflection and load of a Belleville control spring employing the return spring of this invention superimposed on a dotted line graph of the theoretical characteristics of a Belleville spring. The control spring will deflect to point A and then snap over to point E. The return spring limits the overtravel of the Belleville control spring and prevents the control spring from deflecting as in FIGURE 4 to point B. The positive return force exerted on the control spring by the return spring causes the control spring deflection to decrease to point F upon a decrease in load. At point F, the control spring will snap back to point G.

It is apparent from the two diagrams that the return spring causes the control spring to snap back while still under considerable load at a relatively high rate of shaft speed. This eliminates the necessity of slowing the machine shaft down, to the extent shown in FIGURE 4, before the spring assumes a position that will allow the trip mechanism to be reset.

While I have described a preferred embodiment of the invention, it will be understood that the invention may be otherwise embodied within the scope of the following claims.

I claim:

1. A trip mechanism for shaft speed governing apparatus comprising a first Belleville control spring encircling the shaft, collars mounted on said shaft at opposite sides of said spring, the first of said collars normally engaging the inner area of the concave side of the spring, the second of said collars on the opposite side of said spring normally engaging the convex side of said spring, said first Belleville spring having weights mounted on the concave side of the spring, the said spring and weights being so proportioned and related that the spring will snap over when the shaft starts to exceed a predetermined maximum speed and will snap back when the speed is reduced, a second Belleville spring positioned between the said second collar and a third collar, said second collar engaging the inner area of the concave side of said second spring, said second spring being so proportioned and related to said first spring that it will stress the first spring toward the low speed position when said first spring is in the high-speed, snapped-over position.

2. In a shaft speed limiting device for a shaft rotating at high speed, a first Belleville control spring mounted on said shaft, said spring having weights thereon, said spring and weights being so proportioned that the spring will snap over when the shaft exceeds a predetermined maximum speed and will snap back when the speed is reduced, a second Belleville spring, said second spring being mounted on said shaft in such a position that said second spring will stress said first spring toward the low speed position when said first spring is in the high-speed, snapped-over position.

References Cited
UNITED STATES PATENTS

| | | | |
|---|---|---|---|
| 1,713,148 | 5/1929 | Schild | 200—80 XR |
| 2,416,973 | 3/1947 | Wright | 73—546 XR |
| 2,973,771 | 3/1961 | Barth et al. | 137—57 |

JAMES J. GILL, *Primary Examiner.*